United States Patent [19]

Mears

[11] Patent Number: 4,726,140
[45] Date of Patent: Feb. 23, 1988

[54] FISHERMEN'S LINE CUTTER

[76] Inventor: Stanley P. Mears, Rte. 7, Box 388, Meadville, Pa. 16335

[21] Appl. No.: 924,987

[22] Filed: Oct. 30, 1986

[51] Int. Cl.$^4$ ............................................. A01K 97/00
[52] U.S. Cl. ............................................................ 43/25
[58] Field of Search ................ 43/25, 18.1; 30/269 R; 24/442; 224/901, 913

[56] References Cited

U.S. PATENT DOCUMENTS

| | | | |
|---|---|---|---|
| 2,561,289 | 7/1951 | Paris | 51/211 R |
| 2,610,399 | 9/1952 | Adams | 30/296 R |
| 3,128,023 | 4/1964 | Cook | 43/25 |
| 3,370,818 | 2/1968 | Perr | 24/442 |
| 3,521,393 | 7/1970 | Gordon | 43/25 |
| 4,345,704 | 8/1982 | Boughton | 224/901 |
| 4,648,197 | 3/1987 | Weiberg | 43/25 |

*Primary Examiner*—Gene P. Crosby
*Attorney, Agent, or Firm*—Charles L. Lovercheck; Wayne L. Lovercheck; Dale R. Lovercheck

[57] ABSTRACT

A line cutter is disclosed made up of an integrally molded plastic part having a bottom flange adapted to rest on a fishing rod or the like and an upwardly extending vertical plate-like flange having recesses. The recesses communicate with a razor blade which is integrally molded into the plastic body. The line cutter can be supported on a fishing rod or the like by a Velcro support or other suitable support. A fisherman can cut his line by holding a piece of line in two hands and engaging the exposed pieces of razor blade in the recesses.

10 Claims, 5 Drawing Figures

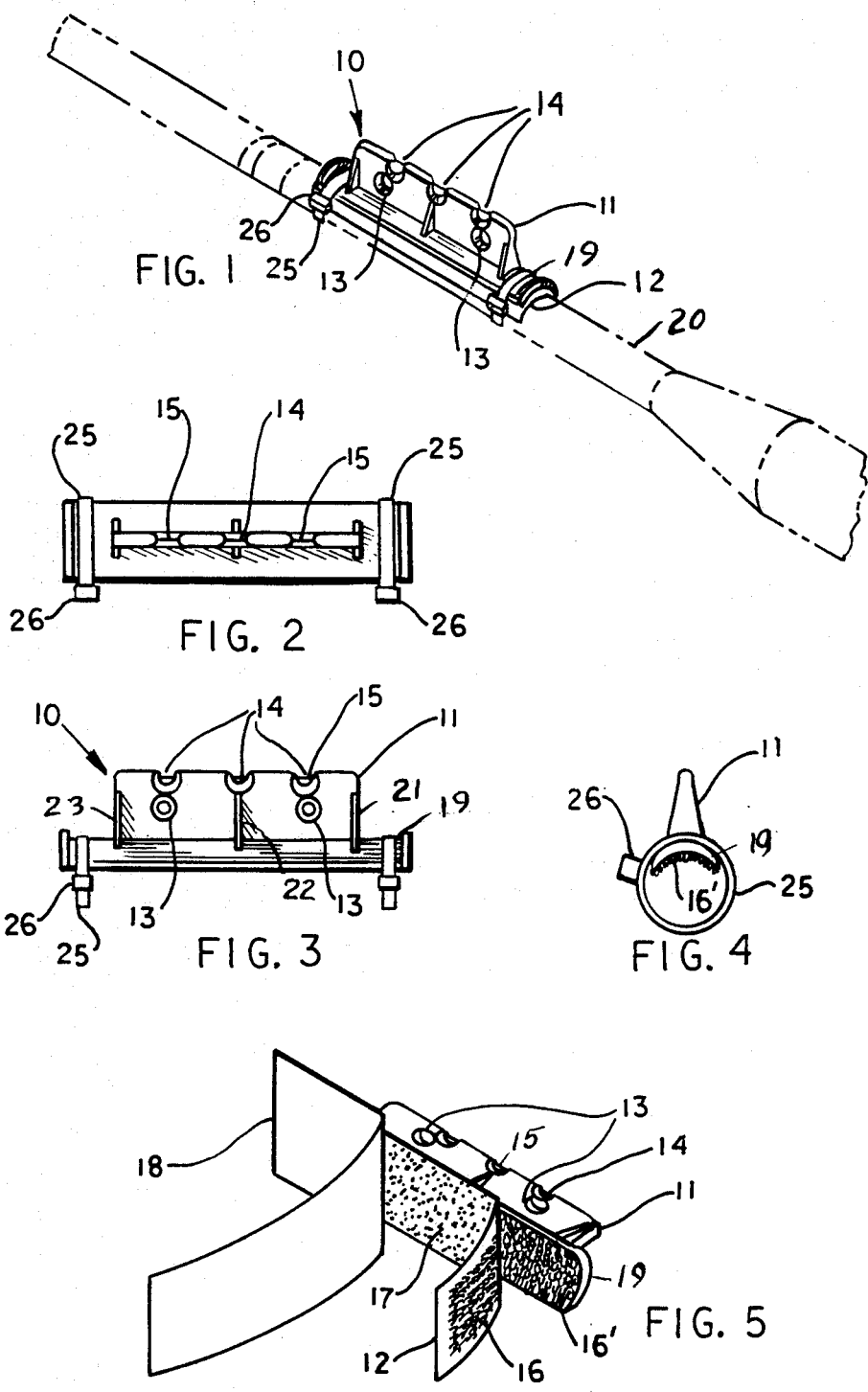

FISHERMEN'S LINE CUTTER

BACKGROUND OF THE INVENTION

This invention relates to a line cutter and more particularly to a cutter for cutting fish line or other twine. Fishermen have for many years had a problem cutting their fish line. When a fisherman changes the fish line in his tackle and attaches a different hook, leader, spreader, swivel or other element of tackle to the line, it is necessary to cut off an end of the line. There is presently, to Applicant's knowledge, no convenient cutting device. Some fishermen carry a Scout knife in their tackle boxes to cut line. Others carry an old razor blade. Some even carry a fingernail clipper or other line cutting means. Many other cutting devices have been used, all of which first must be located in the tackle box and held by hand during use in cutting. Most such prior cutting instruments that are located in a fisherman's tackle box are frequently under fish lures, fish hooks, reels, or other items of tackle and it is difficult to find the cutting device. Moreover, scout knives, razor blades, clippers or other prior cutting devices require that the fisherman hold the cutting device in his hand while his hand is needed for use of other purposes at the time.

STATEMENT OF THE INVENTION

Applicant has discovered that by providing a line cutting device removably supported on a fishing rod and held firmly in place, which does not have to be held by hand, the device will solve the original problem of a cutting means for cutting a fish line.

OBJECTS OF THE INVENTION

It is an object of the invention to provide an improved line cutter.

Another object of the invention is to provide an improved line cutter supportable on a fishing rod, where it will be readily accessible for use by a fisherman.

Another object of the invention is to provide a line cutting device that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWINGS

FIG. 1 is an isometric view of the line cutter according to the invention supported on a fishing rod.

FIG. 2 is a top view of the line cutting device shown in FIG. 1.

FIG. 3 is a side view of the line cutting device shown in FIGS. 1 and 2.

FIG. 4 is an end view of the line cutting device.

FIG. 5 is an isometric view showing the line cutting device and the Velcro material partly removed and the paper cover partly removed from the pressure sensitive adhesive surface prior to applying the cutter to the fishing rod.

DETAILED DESCRIPTION OF THE DRAWINGS

Now with more particular reference to the drawing, I show a line cutting device indicated generally at 10 having a plate-like body portion 11 supported on a plate-like flange 19. The plate-like flange 19 is integrally molded to the plate-like body 11 and is curved to conform to the top surface of a fishing rod 20. Laterally disposed flanges 21, 22 and 23 are integrally attached to the plate-like body 11 and extend downwardly and outwardly and are attached to the plate-like support flange 19 to reinforce the cutter.

A razor blade 15 is integrally molded into the plastic material of the plate-like body 11 and is exposed through the recesses 14 at the top of the line cutter 10. The razor blade 15 has holes whereby it can be supported as an insert in a mold by engagement through the holes 13.

A male Velcro material 16 is supported on the foam pad 12. The outer side of the foam pad 12 has pressure sensitive adhesive 17 on it covered by a cover paper strip 18 in a manner familiar to those skilled in the art. Female Velcro material 16' is supported on the concave lower side of the plate-like flange 19 and is removably attached to the male Velcro material 16 to hold the line cutter body 11 firmly in place on the fishing rod 20. The line cutter can be readily removed for travel and storage.

Although the primary location for said line cutter is the fishing rod, the line cutter can also be attached to fishing tackle boxes, boats and/or personal clothing such as a jacket and used or stored at these locations. In addition to the Velcro material, the line cutter may be permanently attached to a fishing rod by use of plastic binder strap 25 that passes around the flange 19 and rod 20, having loops 26 with detents that engage the strap in a manner familiar to those skilled in the art. The line cutter could similarly be supported on any supporting surface for cutting twine in a store or the like.

To use the device, the operator will remove the cover paper strip 18 from the pressure sensitive material 17, clean off a section on the top of his fishing rod and place the foam pad 12 in position on the top of the rod. He may then rest the female Velcro material 16' on the male Velcro material 16 to hold the device firmly in position. He will then grasp the line on each side of the point to be cut and press the line against the top edge of the razor blade 15 in the recesses 14.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A line cutter comprising a plate-like body portion,
  a plate-like flange integrally attached to said plate-like body portion and disposed generally at a right angle to said plate-like body,
  said plate-like flange and said plate-like body being integrally molded together into one piece,
  at least one recess formed in the top of said plate-like body portion of said line cutter,
  a razor blade integrally molded into said plate-like body and exposed at said recesses, pressure sensitive material being supported on the bottom of said plate-like flange whereby said line cutter can be held in position on a fishing rod.

2. In combination, a fishing rod and a line cutter comprising a plate-like body,
   a plate-like flange integrally attached to said plate-like body and disposed generally at a right angle to said plate-like body,
   said plate-like flange and said plate-like body being integrally molded together into one piece,
   at least one recess formed in the top of said line cutter,
   a razor blade integrally molded into said plate-like flange and exposed at said recesses,
   pressure sensitive material being supported on the bottom of said plate-like flange whereby said line cutter can be held in position on a fishing rod.

3. The line cutter recited in claim 1 wherein said plate-like flange of said line cutter is convex shaped.

4. The combination recited in claim 3 wherein the bottom surface of said plate-like flange has a Velcro material thereon,
   said Velcro material adapted to be supported on a fishing rod whereby said line cutter can be attached to said fishing rod.

5. The combination recited in claim 2 wherein said plate-like flange has a Velcro material on the lower side thereof,
   said fishing rod has a Velcro material supported on its top,
   said plate-like flange is supported on said Velcro material on said fishing rod.

6. The combination recited in claim 5 wherein said Velcro material is supported on said fishing rod by means of a pressure sensitive adhesive.

7. The combination recited in claim 6 wherein said Velcro material has pressure sensitive material on the side thereof remote from said Velcro,
   a paper strip covers said pressure sensitive material.

8. The combination recited in claim 2 wherein said recesses in said plate-like flange are open to the top,
   said razor blade closes the bottom of said recesses.

9. The combination recited in claim 2 wherein two spaced straps of plastic material are wrapped around said fishing rod and around said plate-like flange and secured in position holding said line cutter in position on said rod in a permanent manner.

10. The combination recited in claim 7 wherein two spaced straps of plastic material are wrapped around said fishing rod and around said plate-like flange and secured in position holding said line cutter in position on said rod in a permanent manner.

* * * * *